(12) United States Patent
Mizuta (10) Patent No.: US 9,215,362 B2
(45) Date of Patent: Dec. 15, 2015

(54) IMAGE CAPTURING SYSTEM AND IMAGE CAPTURING METHOD

(71) Applicant: Seiko Epson Corporation, Tokyo (JP)

(72) Inventor: Kazumasa Mizuta, Fujisawa (JP)

(73) Assignee: Seiko Epson Corporation (JP)

( * ) Notice: Subject to any disclaimer, the term of this patent is extended or adjusted under 35 U.S.C. 154(b) by 295 days.

(21) Appl. No.: 13/857,368

(22) Filed: Apr. 5, 2013

(65) Prior Publication Data

US 2013/0265440 A1    Oct. 10, 2013

(30) Foreign Application Priority Data

Apr. 9, 2012    (JP) .................................. 2012-088185

(51) Int. Cl.
*H04N 5/232*    (2006.01)

(52) U.S. Cl.
CPC ................................. *H04N 5/23203* (2013.01)

(58) Field of Classification Search
CPC ................................................ H04N 5/23203
USPC ........................................................ 348/169
See application file for complete search history.

(56) References Cited

U.S. PATENT DOCUMENTS

| 5,610,678 A | 3/1997 | Tsuboi et al. |
| 6,611,662 B1 * | 8/2003 | Grober ............................ 396/55 |
| 7,365,793 B2 * | 4/2008 | Cheatle et al. ................ 348/373 |
| 2005/0134685 A1 * | 6/2005 | Egnal et al. .................... 348/157 |
| 2008/0036862 A1 * | 2/2008 | Lang et al. ..................... 348/156 |
| 2014/0009632 A1 * | 1/2014 | Glover ..................... 348/211.99 |

FOREIGN PATENT DOCUMENTS

| JP | 07-199281 | 8/1995 |
| JP | 07-209700 | 8/1995 |
| JP | 2000-333161 | 11/2000 |

\* cited by examiner

*Primary Examiner* — Jamie Atala
*Assistant Examiner* — James Boylan
(74) *Attorney, Agent, or Firm* — Harness, Dickey & Pierce, P.L.C.

(57) ABSTRACT

An image capturing system includes a sensor unit that is worn on an user and includes a first motion sensor that detects motion of the user and a subject tracking apparatus that is integrated with a camera platform on which an imaging apparatus is mounted, includes a second motion sensor that detects motion of the camera platform, and controls the motion of the camera platform by using the second motion sensor based on the motion of the user detected by the first motion sensor to allow the imaging apparatus to track a subject.

7 Claims, 8 Drawing Sheets

IMAGE CAPTURING SYSTEM AND IMAGE CAPTURING METHOD

BACKGROUND

1. Technical Field

The present invention relates to an image capturing system, an image capturing method, and other technologies.

2. Related Art

In general, an imaging apparatus (camera and video camcorder, for example) requires a user to look into a finder or check a backside monitor before capturing an image of a subject. To this end, the user needs to move the imaging apparatus to a position close to the face of the user during the image capturing operation, which is cumbersome.

JP-A-7-199281 and JP-A-7-209700 each propose an image capturing system including an independent finder separate from an imaging apparatus. In the image capturing systems described in JP-A-7-199281 and JP-A-7-209700, a user does not need to move the imaging apparatus to a position close to the face of the user during the image capturing operation because the imaging apparatus tracks the independent finder in such a way that the image capturing direction of the imaging apparatus coincides with the direction in which the independent finder faces.

JP-A-7-199281 and JP-A-7-209700 describe that the imaging apparatus can be separated from the user, but in practice, the user cannot properly capture an image of a subject. For example, a situation in which the subject is located between the imaging apparatus and the user causes a problem because the imaging apparatus does not face the subject.

JP-A-2000-333161 proposes a monitoring system in which an imaging apparatus tracks the line of sight of a monitoring operator (corresponding to the user described above) through remote manipulation. The monitoring system does not have the problem with JP-A-7-199281 and JP-A-7-209700.

In JP-A-2000-333161, however, it is necessary to use glasses with built-in monitors (that is, head-mounted display), and it is not realistic that the user who wears a large, heavy head-mounted display performs image capturing operation. For example, in image capturing operation performed, for example, in an athletic festival, the weight of the head-mounted display makes it difficult to track a subject. Further, the exterior appearance of the user who wears the head-mounted display is unnatural and other people may think the appearance odd. Further, using a head-mounted display disadvantageously increases the cost of the system.

SUMMARY

An advantage of some aspects of the invention is to provide an image capturing system and an image capturing method that allow an user who wears a sensor unit that naturally fits thereto and looks at a subject with the user's eyes to cause an imaging apparatus to automatically track the subject for proper image capturing.

(1) An aspect of the invention relates to an image capturing system including a sensor unit that is worn on an user and includes a first motion sensor that detects motion of the user and a subject tracking apparatus that is provided in a camera platform on which an imaging apparatus is mounted, includes a second motion sensor that detects motion of the camera platform, and controls the motion of the camera platform by using the second motion sensor based on the motion of the user detected by the first motion sensor to allow the imaging apparatus to track a subject.

(2) In the image capturing system, the sensor unit may be worn on the head of the user.

(3) In the image capturing system, the first motion sensor and the second motion sensor may be at least one of an acceleration sensor, an angular velocity sensor, and a magnetic sensor.

The image capturing system according to the aspect of the invention includes the sensor unit including the first motion sensor that detects motion of the user and the subject tracking apparatus including the second motion sensor that is integrated with the camera platform on which the imaging apparatus is mounted and detects motion of the camera platform. The first motion sensor is intended to detect motion of the head that moves in synchronization with the motion of the eyes that track a subject. That is, the sensor unit may be worn on the head of the user.

The sensor unit and the subject tracking apparatus communicate with each other, for example, in a wired or wireless manner. The subject tracking apparatus thus allows the imaging apparatus to track a subject based on the motion of the user (that is, signal from first motion sensor) and the motion of the camera platform (that is, signal from second motion sensor).

At this point, the motion of the camera platform is not simply synchronized with the motion of the user, and calibration before image capturing operation, for example, can correct the image capturing angle. The invention therefore differs from the technologies disclosed in JP-A-7-199281 and JP-A-7-209700 and allows the user to properly capture an image of a subject even when the imaging apparatus is separated away from the user.

To this end, in the image capturing system according to the aspect of the invention, actual motion of the camera platform is measured with the corresponding motion sensor. The image capturing system therefore corrects the motion of the camera platform and allows the imaging apparatus to correctly track the subject without having to force the user to use a head-mounted display with built-in monitors for checking operation, unlike JP-A-2000-333161. The user therefore does not need to wear a heavy, large member, such as a head-mounted display, around the head but the sensor unit only needs to be attached, for example, to glasses, which naturally fit onto the user, to detect the motion of the user.

Therefore, according to the image capturing system of the aspect of the invention, when the user who wears the sensor unit that naturally fits thereto looks at a subject with the user's eyes, the imaging apparatus can automatically track the subject and properly capture an image thereof. The sensor unit is not necessarily attached to glasses but may be attached to a cap, sunglasses, a headband, or any other suitable object. Further, the sensor unit may alternatively be attached to a portion of the user other than the head thereof.

The first motion sensor measures motion of the user, and the second motion sensor measures motion of the camera platform. Each of the motion sensors may be at least one of an acceleration sensor, an angular velocity sensor, and a magnetic sensor.

For example, as the first motion sensor by way of example, three-axis acceleration sensors can precisely and accurately measure the motion of the user. Further, providing an angular velocity sensor allows a correction to be made based on a signal from the angular velocity sensor even when motion of the neck is not smooth, whereby detection precision can be improved. Providing a magnetic sensor allows the position where the first motion sensor is attached (head, for example) to be more accurately detected.

The first motion sensor and the second motion sensor may differ from each other in terms of configuration, but the motion sensors preferably have the same configuration. In this case, calibration in which the axes of the sensors are aligned with each other (adjustment before image of subject is captured) can be readily performed.

The camera platform is a movable portion on which the imaging apparatus is mounted and is, for example, part of a tripod. The camera platform is moved in response to an electric signal and capable of changing the image capturing direction of the imaging apparatus mounted on the camera platform (for example, image capturing direction with respect to a reference which can be a direction extending in front of the tripod) based, for example, on a control signal.

(4) In the image capturing system, the subject tracking apparatus may perform first calibration in which an adjustment is so made that in a state in which the user and the imaging apparatus look at a reference point that is a still subject from the same position, the imaging apparatus captures an image of the reference point and second calibration in which an adjustment is so made that in a state in which the user looks at the reference point from a position away from the imaging apparatus, the imaging apparatus captures an image of the reference point.

The image capturing system according to the aspect of the invention performs calibration in which an image of the reference point is captured with the imaging apparatus and the motion of the camera platform is adjusted based on the image. The reference point is not limited to a specific object but only needs to be a still image.

The image capturing system according to the aspect of the invention performs the following two types of calibration: the first calibration performed when the user and the imaging apparatus look at the reference point from the same position; and the second calibration performed when the user looks at the reference point from a position away from the imaging apparatus, that is, from a location where the user observes a subject.

In the first calibration, aligning the axes of the first motion sensor and the second motion sensor with each other in a state in which the line of sight of the user coincides with the image capturing direction of the imaging apparatus mounted on the camera platform allows the camera platform to move afterward in accordance with the motion of the user.

The second calibration, in which the image capturing angle is corrected, can then eliminate the difference between the line of sight of the user in an actual observation location and the image capturing direction of the imaging apparatus mounted on the camera platform. As a result, the problem with JP-A-7-199281 and JP-A-7-209700, that is, the problem of improper image capturing operation that occurs when a subject is located between the imaging apparatus and the user is solved.

According to the aspect of the invention, the user who captures an image of a subject with an imaging apparatus located in a remote position can properly capture an image of the subject only by performing the two simple types of calibration to allow the imaging apparatus to automatically track the subject.

(5) In the image capturing system, the sensor unit may be attached to a member worn on the head of the user and including a display section and produce a display control signal that instructs the display section to display information according to at least one of an image capturing direction and an image capturing range of the imaging apparatus.

(6) In the image capturing system, the sensor unit may be attached to glasses worn by the user.

According to the aspect of the invention, the sensor unit may be attached to a member worn on the head of the user and including a display section. The thus attached sensor unit can improve convenience for the user by instructing the display section to display information according to at least one of the image capturing direction and the image capturing range of the imaging apparatus.

The user does not need to wear a large, heavy member, such as a head-mounted display including monitors, but may desire to know the image capturing direction and the image capturing range during remote image capturing operation in some cases. According to the aspect of the invention described above, providing the member worn on the head of the user with a display section allows the user to be informed of the information described above.

The member worn on the head of the user may be glasses. In this case, the sensor unit can naturally fit to and worn on the head of the user and other people will not think the appearance of the user odd. Further, glasses will not cause any difficulty in tracking a subject. The display section may be a liquid crystal sheet or an LED or any other light emitting device attached to each lens portion of the glasses.

(7) Another aspect of the invention relates to an image capturing method using a sensor unit that is worn on an user and includes a first motion sensor that detects motion of the user and a subject tracking apparatus that is provided in a camera platform on which an imaging apparatus is mounted, includes a second motion sensor that detects motion of the camera platform, and controls the motion of the camera platform by using the second motion sensor based on the motion of the user detected by the first motion sensor to allow the imaging apparatus to track a subject, the method including making an adjustment in such a way that in a state in which the user and the imaging apparatus look at a reference point that is a still subject from the same position, the imaging apparatus captures an image of the reference point and making an adjustment in such a way that in a state in which the user looks at the reference point from a position away from the imaging apparatus, the imaging apparatus captures an image of the reference point.

The image capturing method according to the aspect of the invention includes performing calibration in which an image of the reference point is captured with the imaging apparatus and the motion of the camera platform is adjusted based on the image.

According to the aspect of the invention, the user who captures an image of a subject with an imaging apparatus located in a remote position can properly capture an image of the subject only by performing the two simple types of calibration to allow the imaging apparatus to automatically track the subject.

BRIEF DESCRIPTION OF THE DRAWINGS

The invention will be described with reference to the accompanying drawings, wherein like numbers reference like elements.

DESCRIPTION OF EXEMPLARY EMBODIMENTS

A preferable embodiment of the invention will be described below in detail with reference to the drawings. The embodiment described below is not intended to unduly limit the contents of the invention set forth in the appended claims. Further, all the configurations described below are not necessarily essential requirements of the invention.

1. Summary of Image Capturing System

Figure 1A:
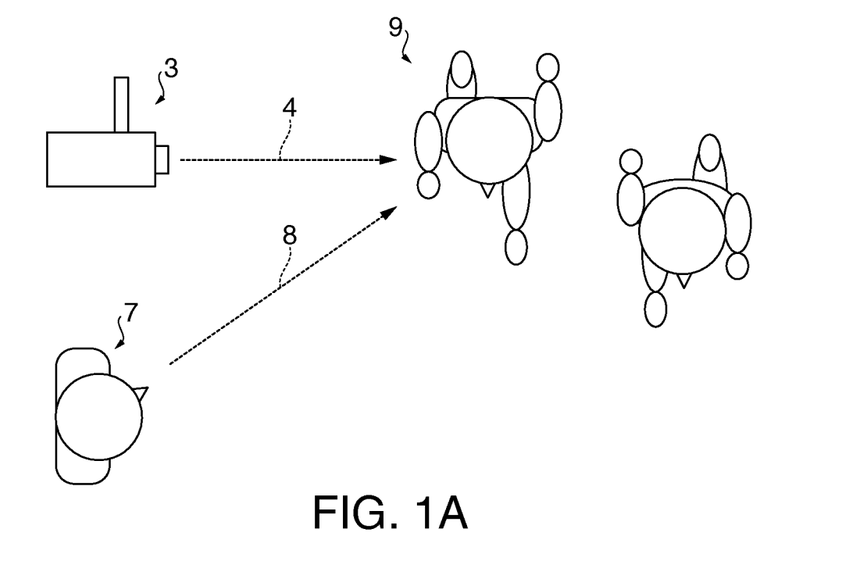
FIGS. 1A and 1B describe a summary of an image capturing system of an embodiment.
Figure 1B:
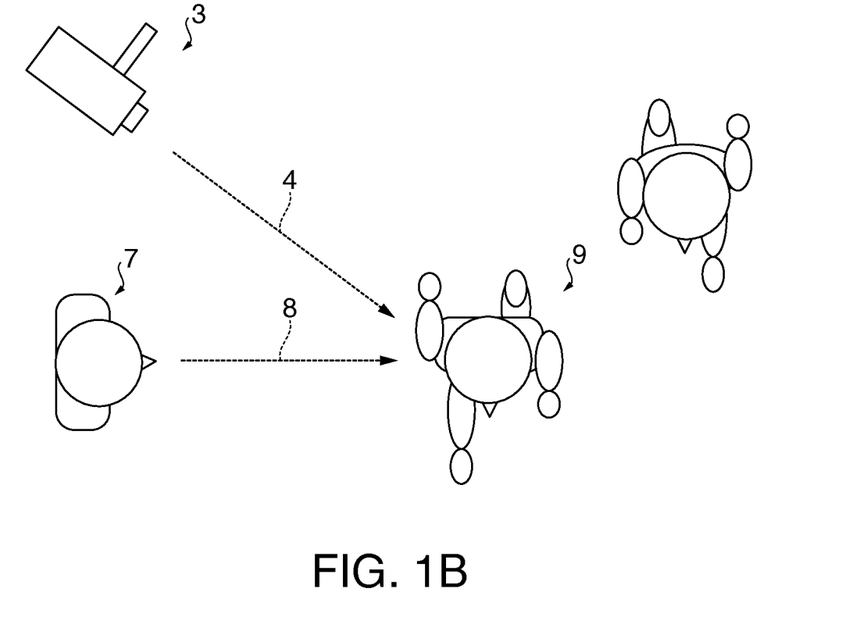

FIGS. 1A and 1B describe a summary of an image capturing system. In the image capturing system of the embodiment, an user 7 in a position separate from an imaging apparatus 3 is looking at a subject 9, as shown in FIG. 1A. The imaging apparatus 3 mounted on an electric camera platform (not shown) is capturing images of the subject 9. The user 7 wears glasses (not shown), and a sensor unit (not shown) attached to the glasses detects motion of the head of the user 7. The electric camera platform is a kind of camera platform and capable of fixing the mounted imaging apparatus 3 with the orientation thereof arbitrarily set by an electric signal.

FIGS. 1A and 1B are top views showing the imaging apparatus 3, the user 7, and the subject 9. It is assumed that the line of sight 8 of the user 7 extends from the tip of the nose (triangle attached to round head of user 7) and that an image capturing direction 4 of the imaging apparatus 3 is the direction in which a lens of the imaging apparatus 3 (protrusion attached to shorter side of rectangle representing body of imaging apparatus 3) faces.

Assume now, for example, that the state shown in FIG. 1A changes to the state shown in FIG. 1B. At this point, when the user 7, specifically, the line of sight 8 tracks the subject 9, the sensor unit detects the motion of the head of the user 7 and transmits the detection result to a subject tracking apparatus (not shown) integrated with the electric camera platform. The imaging apparatus 3 can thus automatically track the subject 9 and keep capturing images of the subject 9.

It is now noted that the change in the line of sight 8 of the user 7 and the change in the image capturing direction 4 of the imaging apparatus 3 in FIGS. 1A and 1B are not equal to each other. That is, the line of sight 8 changes from a state in which it extends in a direction from the user 7 obliquely leftward by about 30 degrees to a state in which it extends in front of the user 7, whereas the image capturing direction 4 changes from a state in which it extends in front of the user 7 to a state in which it extends in a direction from the user 7 obliquely rightward by about 30 degrees.

That is, in the image capturing system of the embodiment, the imaging apparatus 3 does not move simply in accordance with the change in the line of sight 8 of the user 7, but a correction is made based on the positional relationship between the user 7 and the imaging apparatus 3. The imaging apparatus 3 can therefore automatically track the subject 9 and properly capture images thereof even when the user 7 is away from the imaging apparatus 3.

Although FIGS. 1A and 1B, which are plan views of the imaging apparatus 3, the user 7, and the subject 9, show no information in the height direction (the direction toward the reader with respect to the plane of view and the direction away from the reader with respect to the plane of view), the imaging apparatus 3 automatically tracks the subject 9 including the height direction and properly captures images of the subject 9.

Figure 2A:
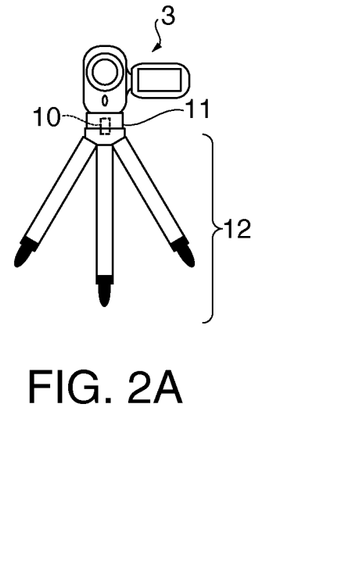
FIGS. 2A and 2B show an example of the configuration of a subject tracking apparatus.
Figure 2B:
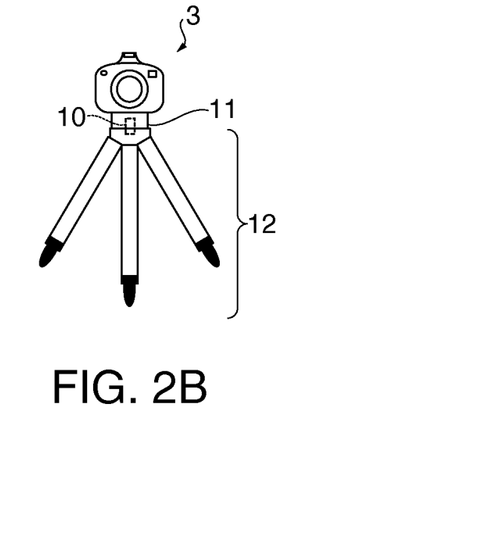

FIGS. 2A and 2B show an example of the configuration of the subject tracking apparatus and specifically show the exterior appearance of the imaging apparatus 3 and the relationship between the imaging apparatus 3 and the subject tracking apparatus 10. The imaging apparatus 3 may be a video camcorder as shown in FIG. 2A, a camera for primarily capturing a still image as shown in FIG. 2B, or any other imaging apparatus, such as a smartphone having an image capturing capability. The other elements are common elements in FIGS. 2A and 2B, and the following description will be made only with reference to FIG. 2A.

The imaging apparatus 3 is mounted on an electric camera platform 11, which is part of a tripod 12, as shown in FIG. 2A. The subject tracking apparatus 10 is integrated with the electric camera platform 11. In the example shown in FIG. 2A, the subject tracking apparatus 10 is located in the electric camera platform 11 and capable of moving the electric camera platform 11. That is, the image capturing direction and image capturing angle of the imaging apparatus 3 can be changed by moving the electric camera platform 11. Further, the motion of the electric camera platform 11 can be detected. It is noted that the image capturing angle is an angular expression of the image capturing direction with respect to a certain direction. For example, the horizontal direction extending in front of the tripod 12 is used as a reference direction, and the image capturing angle may be represented by the angle with respect to the reference direction.

Figure 3A:
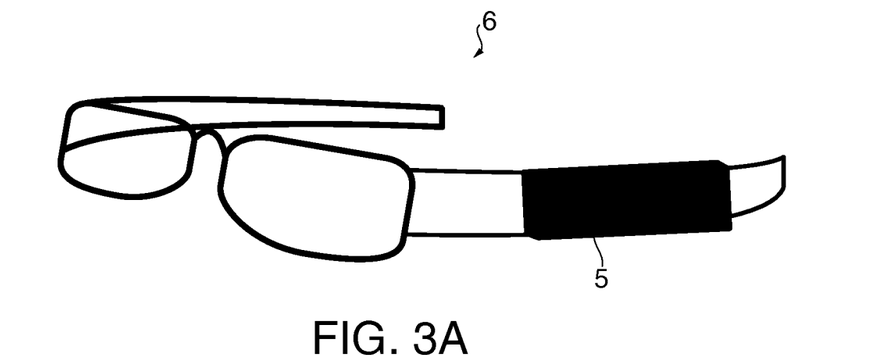
FIGS. 3A and 3B show an example of the configuration of a sensor unit.
Figure 3B:
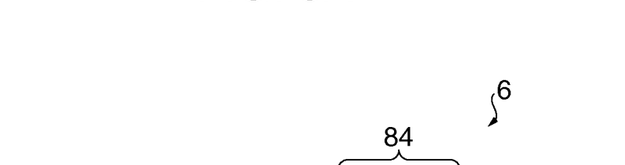

FIGS. 3A and 3B show an example of the configuration of the sensor unit and specifically show the exterior appearance of the sensor unit 5 and the relationship between the sensor unit 5 and glasses 6. The sensor unit 5 of the embodiment has a box-shaped exterior appearance and can be attached to the frame of the glasses 6, which is worn on the user 7, as shown in FIG. 3A. The thus configured sensor unit 5 can naturally fit onto the user 7 when the user 7 uses the image capturing system of the embodiment to capture images.

The sensor unit 5 may, for example, have a length of about 30 mm, a height of about 15 mm, and a thickness of about 10 mm. The user 7 is hardly aware of the thus dimensioned sensor unit 5 when capturing images. The sensor unit 5 may be provided with a string, a rubber band, or any other suitable object and directly worn on the head of the user 7.

FIG. 3B shows lens portions of the glasses 6 and an example of a display section attached to the frame that surrounds one of the lens portions. It is noted that no frame other than the frame around the lens portions is shown. The display section may, for example, be a liquid crystal display section 82 affixed to each of the lens portions or an LED display section 84 formed of LEDs attached to the frame around one of the lens portions and turned on and off. The sensor unit 5 informs the user 7 of an image capturing state of the imaging apparatus 3 and an abnormal event thereof by displaying them in the liquid crystal display section 82 or the LED display section 84 in a wired or wireless manner.

The sensor unit 5 of the embodiment can be attached to the glasses 6, such as those typically used, and no head-mounted display is required. The user therefore does not directly look at an image captured by the imaging apparatus 3. To this end, the liquid crystal display section 82 or the LED display section 84 informs the user 7 of the state of zooming, the image capturing direction (image capturing angle), and other information on the imaging apparatus 3.

The liquid crystal display section 82 may display an image capturing range with a dotted line in response to zooming operation of the imaging apparatus 3, as shown in FIG. 3B. Further, when the image capturing direction of the imaging apparatus 3 is changed, the LED display section 84 may inform the user 7 of the change by changing the on-off state of the LEDs of the LED display section 84. Moreover, in response to an abnormal event, for example, when data transmitted from the subject tracking apparatus 10 is not received, when the imaging apparatus 3 is removed from the electric camera platform 11, and when the tripod 12 collapses, all the LEDs of the LED display section 84 may be so turned on and off that they flash to inform the user 7 of the abnormal event.

In the embodiment, the sensor unit 5, which is attached to the glasses 6 and instruct the display section to display information as shown in FIG. 3B, is not necessarily provided with the display function. In this case, the sensor unit 5 is not necessarily worn on the head of the user but can be worn on part of the body or clothes thereof where the sensor unit 5 does not prevent image capturing operation. For example, the sensor unit 5 can be worn on either of the shoulders, either of the arms, a chest pocket of the clothes, or a belt around the waist of the user. In this case, the sensor unit 5 assumes that the subject 9 is present in front of the body of the user 7 and detects the motion thereof. Alternatively, when the user is supposed to point the subject 9 with a finger, the sensor unit 5 may be worn on the finger.

2. Configuration of Image Capturing System
2-1. Overall Configuration

Figure 4:
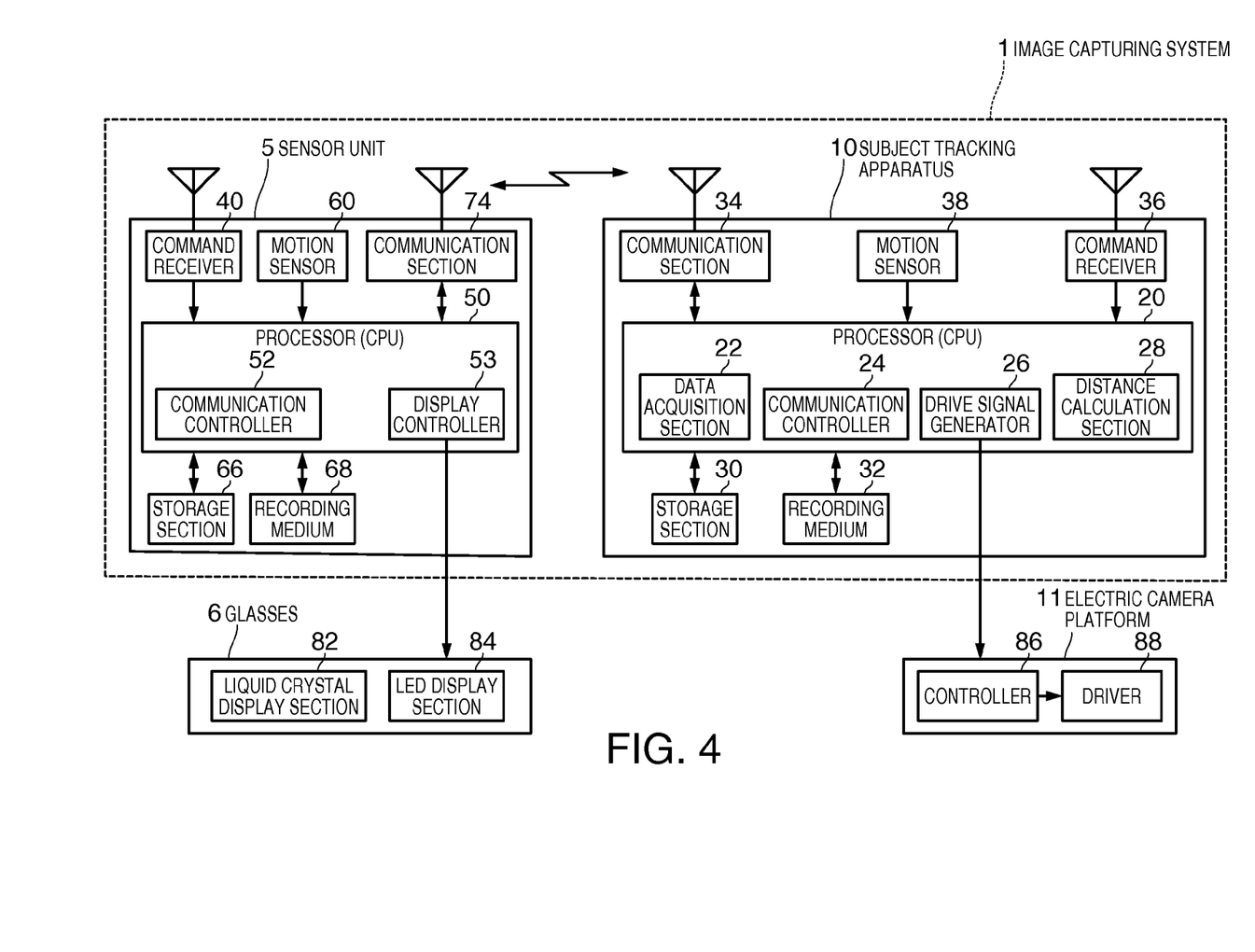
FIG. 4 is a block diagram of the image capturing system of the embodiment.

FIG. 4 shows an example of the configuration of the image capturing system of the embodiment. In the image capturing system of the embodiment, part of the components (portions) shown in FIG. 4 may be omitted or changed, and other components may be added to the configuration shown in FIG. 4.

The image capturing system 1 of the embodiment includes the sensor unit 5 and the subject tracking apparatus 10, as shown in FIG. 4, which wirelessly communicate with each other. The communication method is not limited to a wireless method but may be a wired method. In the latter case, the user 7 can move away from the imaging apparatus 3, for example, within a range determined by the length of a cable.

In the image capturing system 1 of the embodiment, the sensor unit 5 and the subject tracking apparatus 10 directly communicate with each other in a wireless manner, but they may alternatively communicate with each other via the Internet, a LAN, or any other communication network.

The sensor unit 5 informs the user 7, for example, of the imaging state of the imaging apparatus 3 and an abnormal event thereof by displaying them in the liquid crystal display section 82 or the LED display section 84 attached to the glasses 6, which are not part of the image capturing system 1. A display controller 53, which will be described later, produces a display control signal supplied to the liquid crystal display section 82 or the LED display section 84.

The subject tracking apparatus 10 generates a drive signal that drives the electric camera platform 11 to allow the imaging apparatus 3 to track a subject and outputs the drive signal to the electric camera platform 11, which is not part of the image capturing system 1. A drive signal generator 26, which will be described later, generates the drive signal. A controller 86 in the electric camera platform 11 receives the drive signal, converts or directly forwards the drive signal, and outputs the resultant signal to a driver 88 in the electric camera platform 11. The driver 88 in the electric camera platform 11 is, for example, a motor and moves the electric camera platform 11. The image capturing angle of the imaging apparatus 3 can thus be so changed that the imaging apparatus 3 tracks a subject.

2-2. Configuration of Sensor Unit

The sensor unit 5 includes a command receiver 40, a processor (CPU) 50, a motion sensor 60, a storage section 66, a recording medium 68, and a communication section 74, as shown in FIG. 4. The motion sensor 60 corresponds to a first motion sensor according to the embodiment of the invention.

The command receiver 40 receives a command transmitted, for example, from a remote control operated by the user 7 to the imaging apparatus 3 and sets the sensor unit 5 to be operable in synchronization with the operation of the imaging apparatus 3. For example, when the user 7 operates the remote control to transmit a command of powering the imaging apparatus 3 on or off, the command receiver 40 receives the command and outputs it to the processor (CPU) 50. The processor (CPU) 50 may then control the sensor unit 5 in such a way that a series of processes is initiated or terminated in synchronization with the command.

The motion sensor 60 detects motion of the head of the user 7 and outputs the detection result to the processor (CPU) 50. The motion sensor 60 of the embodiment may be an IMU (inertial measurement unit) including three acceleration sensors and three angular velocity sensors provided for three axes perpendicular to each other. The three-axis acceleration sensors can precisely and accurately measure motion of the head. Further, providing the angular velocity sensors allows a correction to be made based on a signal from the angular velocity sensors even when motion of the neck is not smooth, whereby detection precision can be improved. The number and type of sensors accommodated in the motion sensor 60 are not limited to those described above, and a magnetic sensor, an atmospheric pressure sensor, and other sensors may further be accommodated. For example, providing a magnetic sensor allows the position of the head to be more accurately detected.

The storage section 66 stores programs, data, and other pieces of information that allow the processor (CPU) 50 to carry out calculation processes and control processes. Further, the storage section 66 is used as a working area used by the processor (CPU) 50 and also used to temporarily store programs and data read from the recording medium 68, data received from the subject tracking apparatus 10 via the communication section 74, results calculated by the processor (CPU) 50 in accordance with a variety of programs, and other data.

The processor (CPU) 50 carries out a variety of calculation processes and control processes in accordance with the programs stored in the storage section 66 and on the recording medium 68. For example, the processor (CPU) 50 may receive motion data from the motion sensor 60 and convert the motion data into data expressed in a predetermined format transmittable to the subject tracking apparatus 10. Further, the processor (CPU) 50 carries out a variety of processes according to commands received through the command receiver 40, a process of controlling data communication with the subject tracking apparatus 10 via the communication section 74, and other processes.

In the embodiment, the processor (CPU) 50 includes a communication controller 52 and a display controller 53. In the processor (CPU) 50 of the embodiment, however, part of the components (elements) may be omitted or changed, and other components (elements) may be added.

The processor (CPU) 50 of the embodiment functions as the communication controller 52 and the display controller 53 by executing the programs stored on the recording medium 68. At least part of the communication controller 52 and the display controller 53 may alternatively be achieved by hardware (dedicated circuit).

The recording medium 68 can, for example, be a memory (such as ROM and flash memory). When the sensor unit 5 has a large size, the recording medium 68 may be a variety of optical disks and magnetic disks.

The communication controller 52 carries out a process of controlling data communication with the subject tracking apparatus 10 via the communication section 74. In the embodiment, the communication controller 52 carries out a process of transmitting motion data from the motion sensor 60 to the subject tracking apparatus 10 via the communication section 74. The communication controller 52 may further carry out a process of receiving the imaging state of the imaging apparatus 3 and an abnormal event thereof from the subject tracking apparatus 10 via the communication section 74.

The display controller 53, when it receives the imaging state of the imaging apparatus 3 or an abnormal event thereof, produces a display control signal that instructs the liquid crystal display section 82 or the LED display section 84 attached to the glasses 6 to display the state of the imaging apparatus 3 or the abnormal event thereof.

2-3. Configuration of Subject Tracking Apparatus

The subject tracking apparatus 10 includes a processor (CPU) 20, a storage section 30, a recording medium 32, a communication section 34, a command receiver 36, and a motion sensor 38, as shown in FIG. 4. The motion sensor 38 corresponds to a second motion sensor according to the embodiment of the invention. In the subject tracking apparatus of the embodiment, part of the components (portions) in FIG. 4 may be omitted or changed, and other components may be added.

The command receiver 36 is the same as the command receiver 40 in the sensor unit 5, and no description of the command receiver 36 will therefore be made. The image capturing system 1 of the embodiment includes the two command receivers, the command receiver 36 and the command receiver 40, but only one of them may be provided. In this case, the sensor unit 5 or the subject tracking apparatus 10, the one that includes a command receiver, may transmit a command to the other via the communication section 34 and the communication section 74.

The motion sensor 38 is the same as the motion sensor 60 in the sensor unit 5 except that the motion sensor 38 acquires motion data on the electric camera platform 11, and no description of the motion sensor 38 will therefore be made.

The storage section 30 is the same as the storage section 66 in the sensor unit 5 except that the storage section 30 contains image capturing angle correction data, and no description of the storage section 30 will therefore be made. The image capturing angle correction data are data on the following items to be used in calibration described later: the distance between the subject tracking apparatus 10 and the user 7; the distance to a reference point; motion of the head of the user 7 (motion data); and values used to correct the image capturing angle. The image capturing angle correction data are saved in the storage section 30, for example, in the form of a table.

The recording medium 32 is the same as the recording medium 68 in the sensor unit 5, and no description of the recording medium 32 will therefore be made.

The processor (CPU) 20 carries out a variety of calculation processes and control processes in accordance with programs stored in the storage section 30 and on the recording medium 32. Specifically, the processor (CPU) 20 receives motion data on the head of the user 7 from the sensor unit 5 via the communication section 34 and produces a drive signal for moving the electric camera platform 11.

The processor (CPU) 20 further carries out a variety of processes according to commands through the command receiver 36, a process of correcting the drive signal based on the motion data on the electric camera platform 11 from the motion sensor 38, a distance calculating process in accordance with electric field intensity, a process of controlling data communication with the sensor unit 5 and other components, and other processes.

In the embodiment, the processor (CPU) 20 includes a data acquisition section 22, a communication controller 24, a drive signal generator 26, and a distance calculation section 28. In the processor (CPU) 20 of the embodiment, however, part of the components (elements) may be omitted or changed, and other components (elements) may be added.

The data acquisition section 22 receives motion data on the head of the user 7 via the communication section 34. The distance calculation section 28 measures the electric field intensity of radio waves to determine the distance between the user 7 and the imaging apparatus 3. The distance may alternatively be measured by using infrared light from the remote control, which is used by the user 7 to send a command to the imaging apparatus 3. The distance may be used in the calibration in a process of determining a correction value based on image capturing angle correction data.

The communication controller 24 carries out a process of controlling data communication with the sensor unit 5 and other communication via the communication section 34.

The drive signal generator 26 generates a drive signal. The controller 86 in the electric camera platform 11 receives the drive signal, converts or directly forwards the drive signal, and outputs the resultant signal to the driver 88 in the electric camera platform 11. The driver 88 in the electric camera platform 11 is, for example, a motor and moves the electric camera platform 11. The image capturing angle of the imaging apparatus 3 can thus be so changed that the imaging apparatus 3 tracks a subject.

The drive signal generator 26 further corrects the drive signal. Specifically, the drive signal generator 26 corrects the drive signal based on motion data on the electric camera platform 11 from the motion sensor 38 for accurate subject tracking.

3. Processes Carried Out by Image Capturing System 3-1. Calibration

Figure 5:
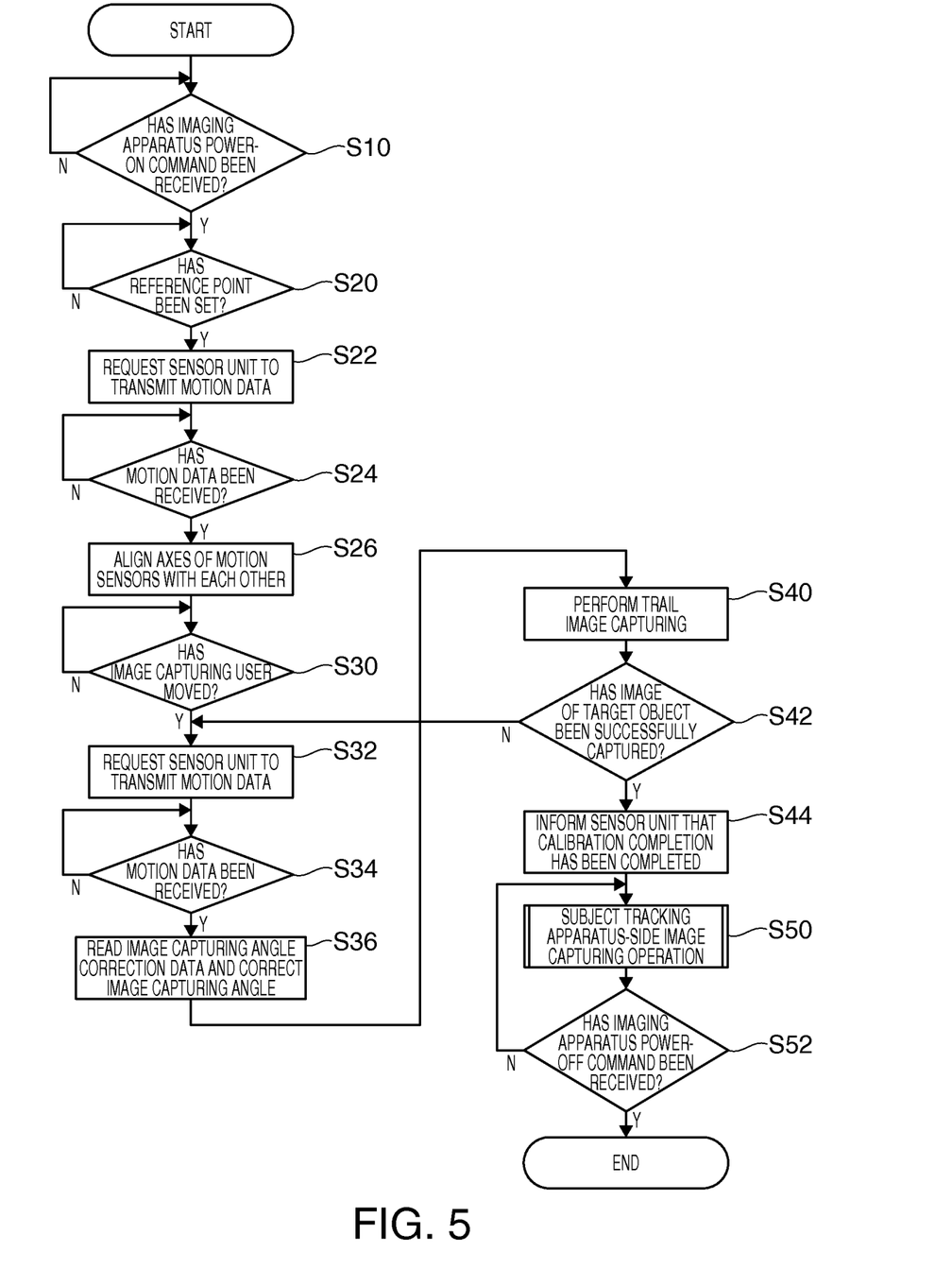
FIG. 5 is a flowchart showing calibration control performed by the subject tracking apparatus of the embodiment.
Figure 6:
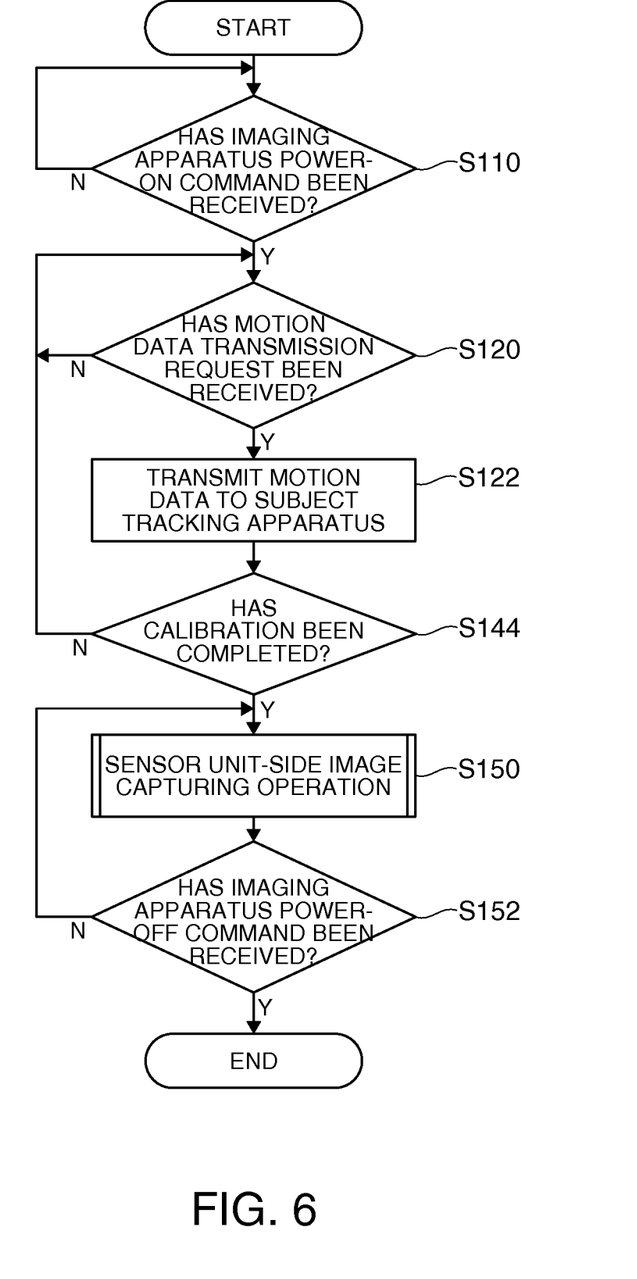
FIG. 6 is a flowchart showing calibration control performed by the sensor unit of the embodiment.
Figure 7A:
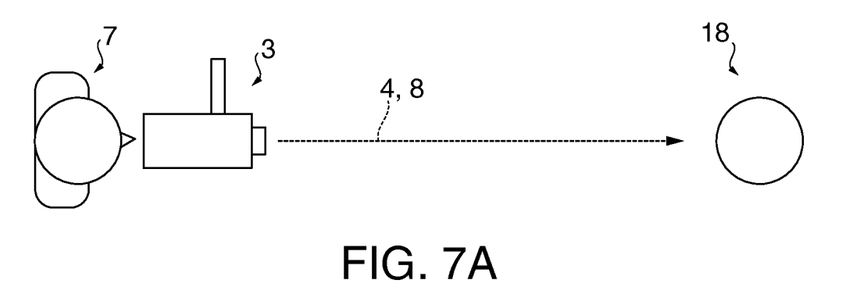
FIGS. 7A and 7B describe the calibration.
Figure 7B:
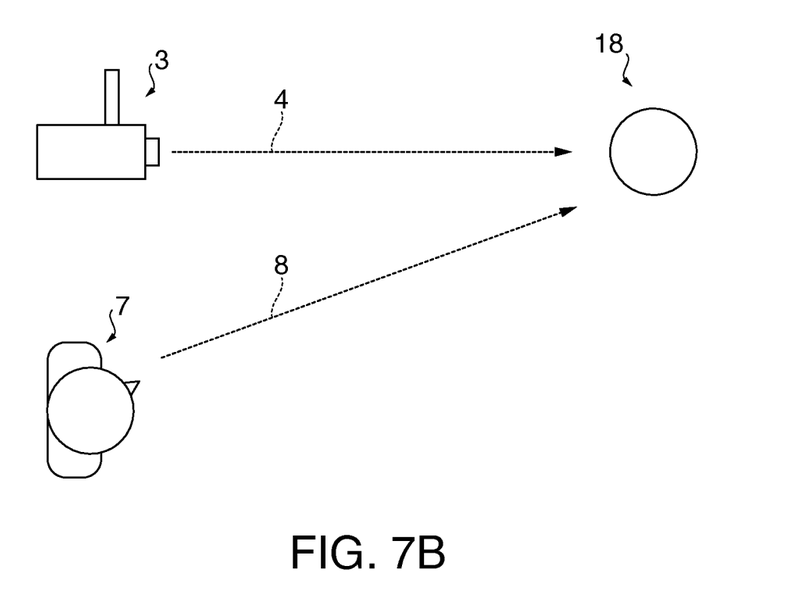

FIGS. 5 and 6 are flowcharts of processes carried out by the image capturing system 1 of the embodiment. FIGS. 7A and 7B describe the calibration. FIGS. 7A and 7B are top views as FIGS. 1A and 1B are, and the same elements as those in FIGS. 1A and 1B have the same reference characters and will not be described.

FIG. 5 shows an exemplary flowchart of processes carried out by the processor (CPU) 20 in the subject tracking apparatus 10. FIG. 6 shows an exemplary flowchart of processes carried out by the processor (CPU) 50 in the sensor unit 5. A description will first be made of calibration performed before the imaging apparatus 3 starts operation of capturing images of the subject 9 (hereinafter simply referred to as image capturing operation) with reference to the flowcharts shown in FIGS. 5 and 6. The calibration used herein is an adjustment process and specifically means an adjustment of the image capturing angle. The description will be made also with reference to FIGS. 7A and 7B as appropriate.

The processor (CPU) 20 in the subject tracking apparatus 10 receives a command of powering the imaging apparatus 3 on (hereinafter referred to as power-on command), for example, from the remote control operated by the user 7 through the command receiver 36 and starts carrying out the processes described below (Y in S10). Otherwise, the processor (CPU) 20 is on standby until it receives the power-on command (N in S10).

The processor (CPU) 50 in the sensor unit 5 also receives the power-on command through the command receiver 40 and starts carrying out the processes described below (Y in S110). Otherwise, the processor (CPU) 50 is on standby until it receives the power-on command (N in S110).

The processor (CPU) 20 in the subject tracking apparatus 10 waits until a reference point is set (N in S20). A reference point 18 (see FIGS. 7A and 7B) is a still subject used in the calibration. Having set the reference point 18, the user 7 may inform the subject tracking apparatus 10 that the reference point 18 has been set, for example, in the form of a command sent from the remote control or any other device or may inform the subject tracking apparatus 10 by using another method, for example, by pressing a button (not shown) provided on the tripod 12. The distance to the reference point is obtained, for example, by using an autofocus capability of the imaging apparatus 3. It is assumed in the following description that the distance to the reference point 18 (and subject 9) is transmitted to the subject tracking apparatus 10 via the electric camera platform 11.

After the reference point 18 has been set (Y in S20), the processor (CPU) 20 in the subject tracking apparatus 10 requests the sensor unit 5 to transmit motion data representing motion of the head of the user 7 (attitude of head, that is, direction of line of sight in this case) (S22). The processor (CPU) 20 then waits until it receives motion data (N in S24).

The processor (CPU) 50 in the sensor unit 5, which has been waiting for a motion data transmission request (N in S120), receives the request from the subject tracking apparatus 10 (Y in S120) and transmits motion data (S122). At this point, since the calibration has not yet been completed (N in S144), the processor (CPU) 50 waits until it receives the following motion data transmission request (N in S120).

Having received the motion data from the sensor unit 5 (Y in S24), the processor (CPU) 20 in the subject tracking apparatus 10 aligns the axis of the motion sensor 38 in the subject tracking apparatus 10 with the axis of the motion sensor 60 in the sensor unit 5 (S26). In the embodiment, the motion sensor 60 and the motion sensor 38 have the same configuration, and the axis alignment means that the axes of the corresponding sensors are aligned with each other.

The processes in steps S22 to S26 correspond to first calibration. The first calibration will be described with reference to FIG. 7A. In the first calibration, the user 7 and the imaging apparatus 3 look at the reference point 18 from the same position, as shown in FIG. 7A. For example, the user 7 may look at the reference point 18 while looking into a finder of the imaging apparatus 3. At this point, the line of sight 8 of the user 7 coincides with the image capturing direction 4 of the imaging apparatus 3.

Aligning the axis of the motion sensor 60 in the sensor unit 5 attached to the glasses 6 worn by the user 7 with the axis of the motion sensor 38 in the subject tracking apparatus 10 integrated with the electric camera platform 11 on which the imaging apparatus 3 is mounted allows the electric camera platform 11 to move afterward in accordance with the motion of the head of the user 7.

The processes carried out by the image capturing system 1 will be described again with reference to FIGS. 5 and 6. The processor (CPU) 20 in the subject tracking apparatus 10 waits until the user 7 moves away from the imaging apparatus 3 to an actual location where the user 7 looks at the subject 9 (hereinafter referred to as observation location) (N in S30). Having moved to an observation location, the user 7 may inform the subject tracking apparatus 10 that the user 7 has moved to the observation location, for example, in the form of a command sent from the remote control or any other device or may inform the subject tracking apparatus 10 by using another method, for example, by pressing a button (not shown) provided on the sensor unit 5 via the communication section 74 in the sensor unit 5.

After the user 7 has moved to the observation location (Y in S30), the processor (CPU) 20 in the subject tracking apparatus 10 requests the sensor unit 5 to transmit motion data representing motion of the head of the user 7 (attitude of head, that is, direction of line of sight in this case) (S32). The processor (CPU) 20 then waits until it receives motion data (N in S34).

The processor (CPU) 50 in the sensor unit 5 receives the request from the subject tracking apparatus 10 (Y in S120) and transmits motion data (S122).

Having received the motion data from the sensor unit 5 (Y in S34), the processor (CPU) 20 in the subject tracking apparatus 10 reads the image capturing angle correction data from the storage section 30 and corrects the image capturing angle (S36). The correction used herein corresponds to determination of the angle between the line of sight 8 of the user 7 extending toward the reference point 18 and the image capturing direction 4 of the imaging apparatus 3 extending toward the reference point 18 (hereinafter referred to as reference point correction angle).

In image capturing operation, for example, the ratio of the distance between the imaging apparatus 3 and a moving subject to the distance between the imaging apparatus 3 and the reference point is determined, and the image capturing angle is calculated based on the reference point correction angle, whereby the subject can be tracked.

The processes in steps S32 to S36 correspond to second calibration. The second calibration will be described with reference to FIG. 7B. In the second calibration, the user 7 moves to the observation location and looks at the reference point 18 from the observation location separate from the imaging apparatus 3, as shown in FIG. 7B. At this point, the angle between the line of sight 8 of the user 7 and the image capturing direction 4 of the imaging apparatus 3 is determined, and the image capturing angle is corrected based thereon.

Performing the second calibration allows determination of an image capturing angle for eliminating the difference between the line of sight of the user 7 in the actual observation location and the image capturing direction of the imaging apparatus 3 mounted on the electric camera platform 11, whereby a subject can be correctly tracked even when the subject is located between the imaging apparatus and the user.

Thereafter, when the processor (CPU) 20 in the subject tracking apparatus 10 is informed that the user 7 has performed trial image capturing (S40) and an image of a target object has been successfully captured (Y in S42), the processor (CPU) 20 informs the sensor unit 5 that the calibration has been completed (S44). When an image of the target object has not been captured (N in S42), the control returns to step S32 and the second calibration is performed again.

Thereafter, the processor (CPU) 20 in the subject tracking apparatus 10 performs image capturing operation (S50) until the processor (CPU) 20 receives a command of powering the imaging apparatus 3 off (hereinafter referred to as power-off command) from the user 7 (N in S52). When the processor (CPU) 20 receives the power-off command (Y in S52), the processor (CPU) 20 stops carrying out the processes. The image capturing operation of the subject tracking apparatus (subject tracking apparatus-side image capturing operation) will be described later.

The processor (CPU) 50 in the sensor unit 5, when the subject tracking apparatus 10 informs the processor (CPU) 50 that the calibration has been completed (Y in S144), performs image capturing operation (S150) until the processor (CPU) 50 receives the power-off command (N in S152). Having received the power-off command (Y in S152), the processor (CPU) 50 stops carrying out the processes. The image capturing operation of the sensor unit 5 (sensor unit-side image capturing operation) will be described later.

3-2. Image Capturing Operation

Figure 8:
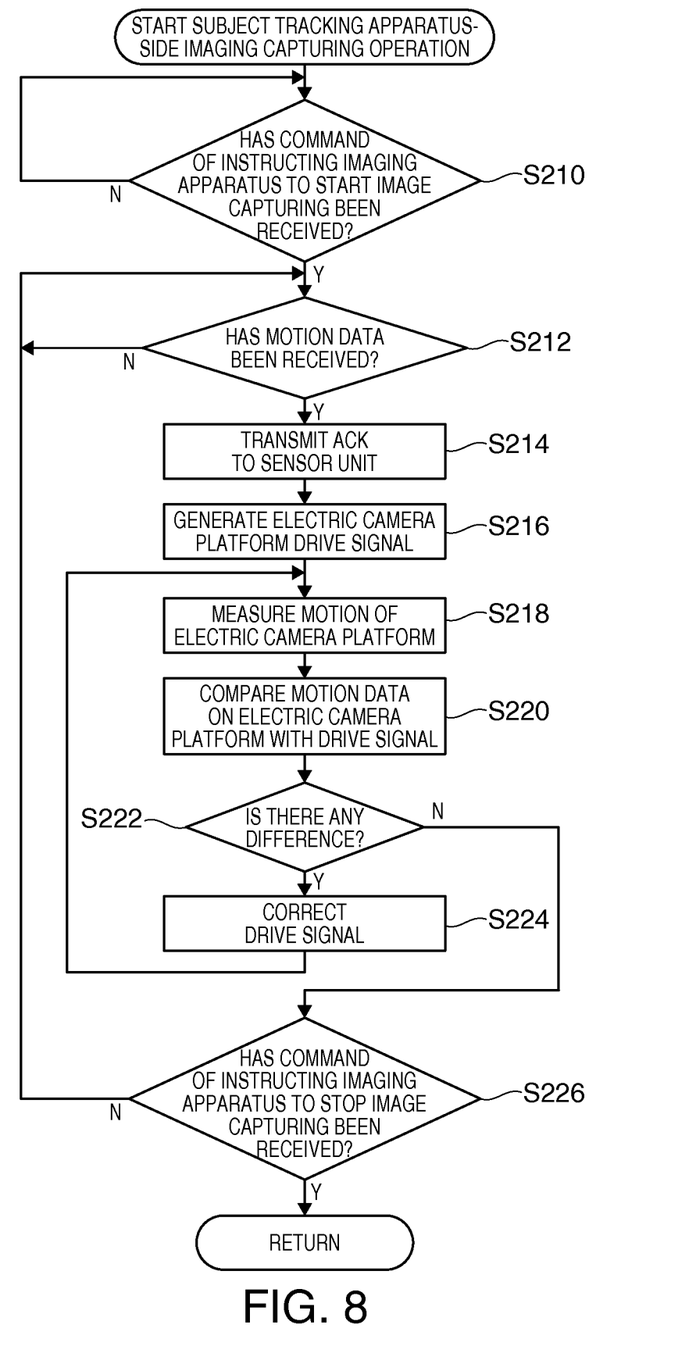
FIG. 8 is a flowchart showing image capturing operation control performed by the subject tracking apparatus of the embodiment.
Figure 9:
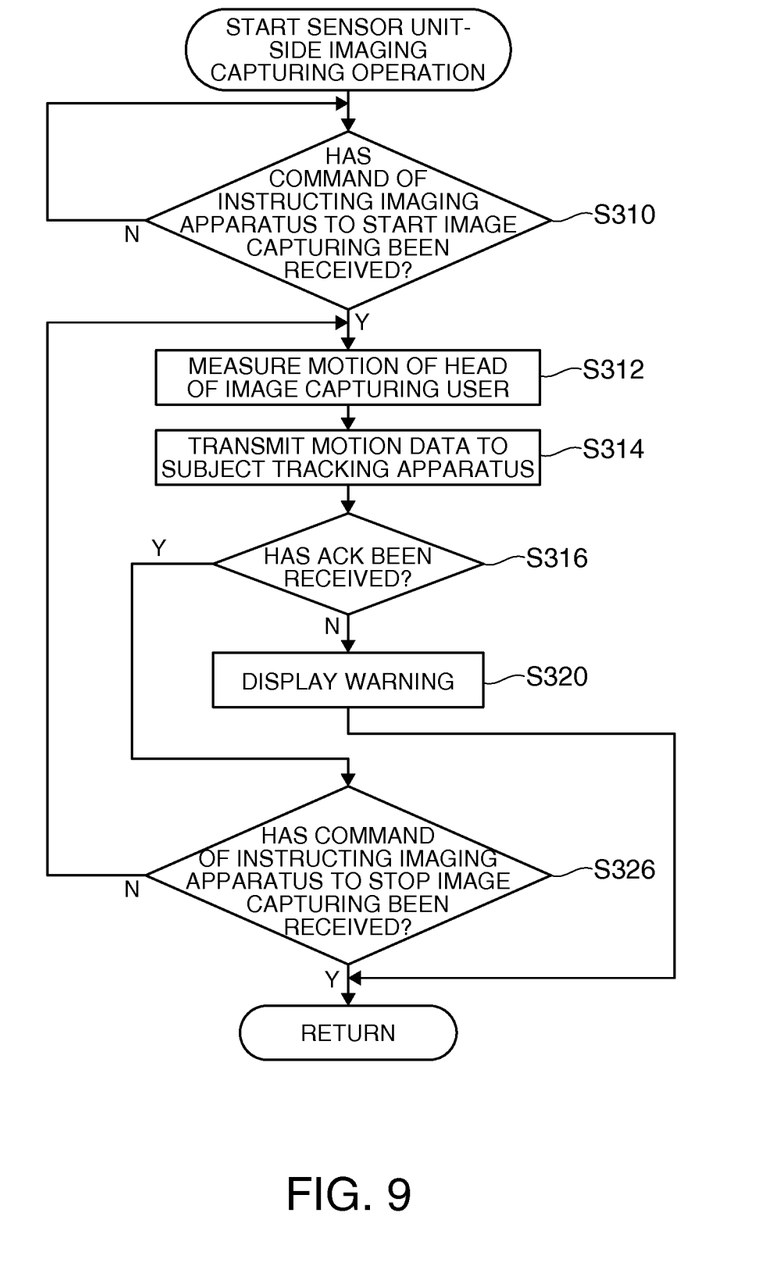
FIG. 9 is a flowchart showing image capturing operation control performed by the sensor unit of the embodiment.

FIGS. 8 and 9 show flowcharts of processes in the image capturing operation of the image capturing system 1 of the embodiment. FIG. 8 is an exemplary flowchart of processes carried out by the processor (CPU) 20 in the subject tracking apparatus 10, and FIG. 9 is an exemplary flowchart of processes carried out by the processor (CPU) 50 in the sensor unit 5.

The processor (CPU) 20 in the subject tracking apparatus 10 receives a command of instructing the imaging apparatus 3 to start image capturing (hereinafter referred to as image capturing start command), for example, from the remote control operated by the user 7 through the command receiver 36 and starts carrying out the processes described below (Y in S210). Otherwise, the processor (CPU) 20 is on standby until it receives the image capturing start command (N in S210).

The processor (CPU) 50 in the sensor unit 5 also receives the image capturing start command through the command receiver 40 and starts carrying out the processes described below (Y in S310). Otherwise, the processor (CPU) 50 is on standby until it receives the image capturing start command (N in S310).

The processor (CPU) 50 in the sensor unit 5 measures motion of the user 7 who looks at the subject 9 and moves the line of sight 8, and the processor (CPU) 50 transmits motion data. That is, the motion sensor 60 measures motion of the head of the user 7 (S312) and transmits motion data to the subject tracking apparatus 10 via the communication section 74 (S314).

The processor (CPU) 20 in the subject tracking apparatus 10 waits until it receives motion data (N in S212). The processor (CPU) 20, when it receives the motion data from the sensor unit 5 (Y in S212), transmits an ACK (ACKnowledge) signal to the sensor unit 5 (S214).

The processor (CPU) 50 in the sensor unit 5, specifically, the drive signal generator 26 first generates a drive signal for moving the electric camera platform 11 (S216). At this point, the image capturing angle is corrected based on a result of the second calibration. That is, the ratio of the distance between the imaging apparatus 3 and a moving subject to the distance between the imaging apparatus 3 and the reference point is determined, and the image capturing angle is calculated based on the reference point correction angle. The drive signal is then generated in accordance with the calculation result (S216). The thus generated drive signal can move the electric camera platform to allow the imaging apparatus 3 to track the subject 9.

In the embodiment, however, the user 7 cannot look at video images of the actual subject 9. It is therefore preferable to provide a function of allowing the user to check if the imaging apparatus 3 correctly tracks the subject 9. The subject tracking apparatus 10, specifically, the motion sensor 38 measures the motion of the electric camera platform 11 (S218). The motion data on the electric camera platform 11 measured by the motion sensor 38 is then compared with the drive signal generated by the drive signal generator 26 (S220). At this point, the format of one of the motion data and the drive signal may be converted into the format of the other for the comparison.

When the comparison shows a difference (Y in S222), the processor (CPU) 20 in the subject tracking apparatus 10 corrects the drive signal (S224), and the control returns to step S218 and the motion of the electric camera platform 11 is measured again.

When the comparison shows no difference (N in S222), the processor (CPU) 20 in the subject tracking apparatus 10 checks if the user 7 has issued a command of instructing the imaging apparatus 3 to stop the image capturing operation (hereinafter referred to as image capturing stop command) (S226). The case where the comparison shows no difference in step S222 is a case where the electric camera platform 11 moves as intended by the drive signal generated by the drive signal generator 26.

When the image capturing stop command has been issued (Y in S226), the processor (CPU) 20 in the subject tracking apparatus 10 terminates the series of image capturing processes. When no image capturing stop command has been issued (N in S226), the control returns to step S212 and the series of image capturing operation is repeated.

After having transmitted the motion data to the subject tracking apparatus 10 but if having received no ACK signal from the subject tracking apparatus 10 (N in S316), the processor (CPU) 50 in the sensor unit 5 displays a warning (S320) and terminates the series of processes. The warning may, for example, be displayed by turning on and off the LED display section 84 in such a way that it flashes.

On the other hand, the processor (CPU) 50 in the sensor unit 5, when it receives an ACK signal from the subject tracking apparatus 10 (Y in S316), checks if the image capturing stop command has been issued. When the image capturing stop command has been issued (Y in S326), the series of image capturing operation is terminated. When no image capturing stop command has been issued (N in S326), the control returns to step S312 and the series of image capturing operation is repeated.

Although not shown in FIG. 9, the processor (CPU) 50 in the sensor unit 5 may display, for example, a frame corresponding to the liquid crystal display section 82 (see FIG. 3B) when the sensor unit 5 receives the image capturing start command (Y in S310) and then the command receiver 40 receives a command representing that the user 7 adjusts zooming of the imaging apparatus 3. Further, when the subject tracking apparatus 10 informs the processor (CPU) 50 of any abnormal event, for example, collapse of the tripod, via the communication section 74, the processor (CPU) 50 may instruct the LED display section 84 to go on and off in such a way that it flashes.

As described above, according to the embodiment, when the user 7 who wears, for example, a sensor unit that is integrated with part of the glasses 6 and naturally fits onto the user 7 looks at the subject 9 with the user's own eyes, the imaging apparatus 3 separate away from the user 7 can automatically track the subject 9. At this point, the subject tracking apparatus 10 measures the motion of the electric camera platform 11 on which the imaging apparatus 3 is mounted and makes a correction necessary to track the subject 9. As a result, the imaging apparatus 3 can properly capture images of the subject 9 even when the user 7 does not look at video images captured with the imaging apparatus 3 by using a head-mounted display or any other apparatus.

4. Others

The scope of the invention encompasses substantially the same configuration as the configuration described in the above embodiment (for example, a configuration having the same function, using the same method, and providing the same result or a configuration having the same purpose and providing the same effect). Further, the scope of the invention encompasses a configuration in which an inessential portion of the configuration described in the above embodiment is replaced with another portion. Moreover, the scope of the invention encompasses a configuration that provides the same advantageous effect as that provided in the configuration described in the above embodiment or a configuration that can achieve the same purpose. Further, the scope of the invention encompasses a configuration in which a known technology is added to the configuration described in the above embodiment.

The entire disclosure of Japanese Patent Application No. 2012-088185, filed Apr. 9, 2012 is expressly incorporated by reference herein.

What is claimed is:

1. An image capturing system that is configured to execute processes by a sensor unit processor and a subject tracking processor, the image capturing system comprising:
    a sensor unit that is worn on an user and includes a first motion sensor that detects motion of the user, the sensor unit including:
        a command receiver that receives a command from outside;
        a first calculator configured to calculate the motion of the user by the first motion sensor to obtain first motion data; and
        a first transmitter that transmits the first motion data; and
    a subject tracking apparatus that is provided in a camera platform on which an imaging apparatus is mounted, includes a second motion sensor that detects motion of the camera platform to obtain second motion data, the subject tracking apparatus including:
        a motion data receiver that receives the first motion data from the sensor unit:
        a drive signal generator configured to generate a drive signal for driving the camera platform based on the first motion data and a relative position of the subject tracking apparatus with respect to a target subject;
        a comparator configured to compare the drive signal with the second motion data; and
        a corrector configured to correct the drive signal to a corrected drive signal for driving the camera platform, wherein
    when the comparator decides that the drive signal correspond to the second motion data, the subject tracking apparatus controls motion of the camera platform based on the drive signal, and
    when the comparator decides that the drive signal does not correspond to the second motion data, the subject tracking apparatus controls the motion of the camera platform based on the corrected drive signal.

2. The image capturing system according to claim 1, wherein the sensor unit is worn on the head of the user.

3. The image capturing system according to claim 1, wherein the first motion sensor and the second motion sensor is at least one of an acceleration sensor, an angular velocity sensor, and a magnetic sensor.

4. The image capturing system according to claim 1, wherein the subject tracking apparatus performs
    first calibration in which an adjustment is so made that in a state in which the user and the imaging apparatus look at a reference point that is a still subject from the same position, the imaging apparatus captures an image of the reference point, and
    second calibration in which an adjustment is so made that in a state in which the user looks at the reference point from a position away from the imaging apparatus, the imaging apparatus captures an image of the reference point.

5. The image capturing system according to claim 1, wherein the sensor unit
    include a display section, and
    the sensor unit produces a display control signal that instructs the display section to display information according to at least one of an image capturing direction and an image capturing range of the imaging apparatus.

6. The image capturing system according to claim 5, wherein the sensor unit is attached to glasses worn by the user.

7. An image capturing method for causing a sensor unit processor and a subject tracking processor to execute processes, the method comprising executing on the sensor unit processor and the subject tracking processor the steps of:
    using a sensor unit that is worn on an user and includes a first motion sensor that detects motion of the user and, the sensor unit including:
        a command receiver that receives a command from outside;
        a first calculator configured to calculate the motion of the user by the first motion sensor to obtain first motion data; and
        a first transmitter that transmits the first motion data;
    a subject tracking apparatus that is provided in a camera platform on which an imaging apparatus is mounted, includes a second motion sensor that detects motion of the camera platform to obtain second motion data, the subject tracking apparatus including:
        a motion data receiver that receives the first motion data from the sensor unit:
        a drive signal generator configured to generate a drive signal for driving the camera platform based on the first motion data and a relative position of the subject tracking apparatus with respect to a target subject;
        a comparator configured to compare the drive signal with the second motion data; and
        a corrector configured to correct the drive signal to a corrected drive signal for driving the camera platform;
    making an adjustment in such a way that in a state in which the user and the imaging apparatus look at a reference point that is a still subject from the same position, the imaging apparatus captures an image of the reference point; and
    making an adjustment in such a way that in a state in which the user looks at the reference point from a position away from the imaging apparatus, the imaging apparatus captures an image of the reference point, wherein
    when the comparator decides that the drive signal correspond to the second motion data, the subject tracking apparatus controls motion of the camera platform based on the drive signal, and
    when the comparator decides that the drive signal does not correspond to the second motion data, the subject tracking apparatus controls the motion of the camera platform based on the corrected drive signal.

* * * * *